Dec. 11, 1928.
J. LEDWINKA
1,694,883
AUTOMOBILE BODY
Filed Dec. 28, 1923
4 Sheets-Sheet 1
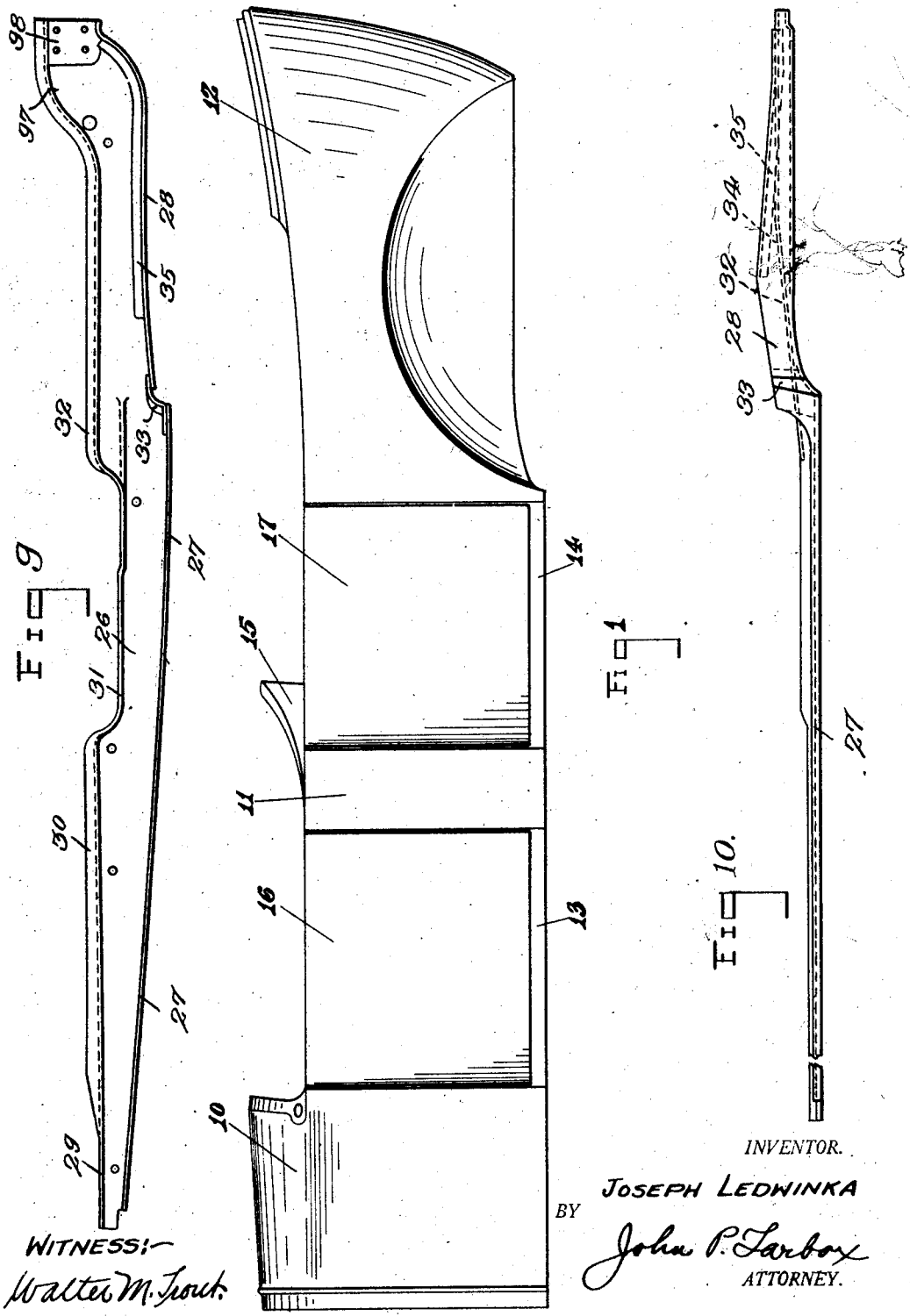
INVENTOR.
JOSEPH LEDWINKA
BY
John P. Larbox
ATTORNEY.
WITNESS:—
Walter M. Trout.

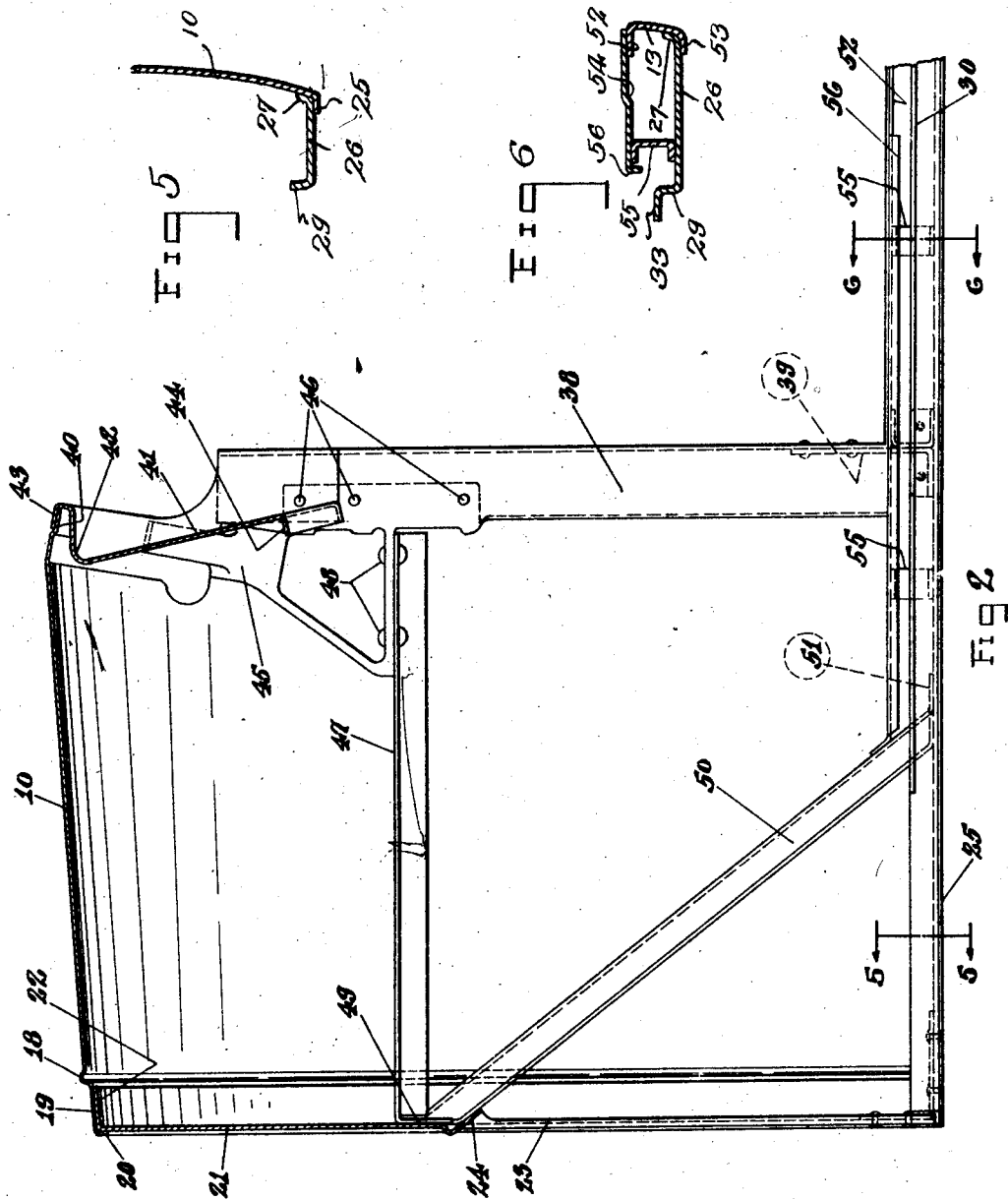

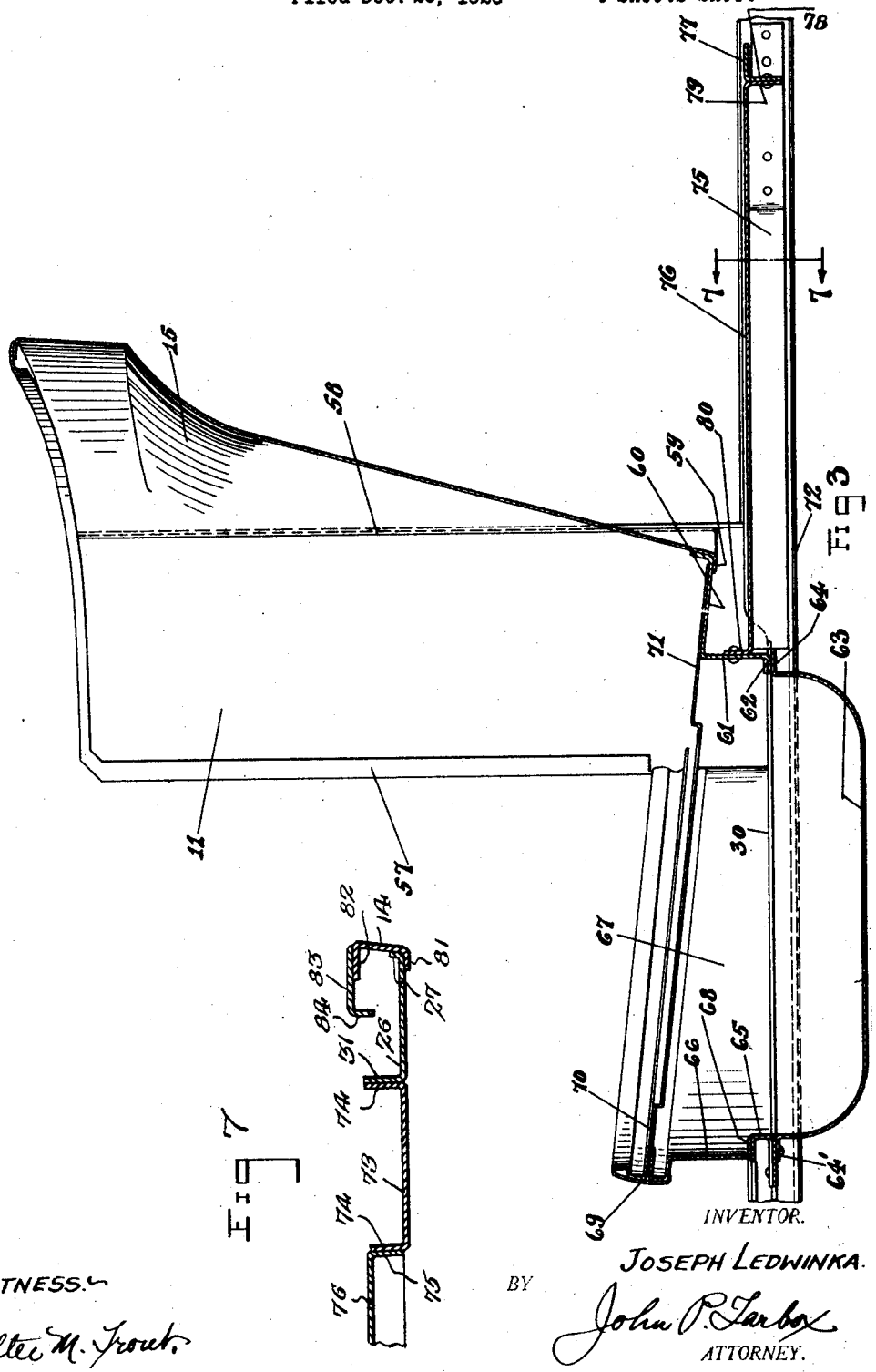

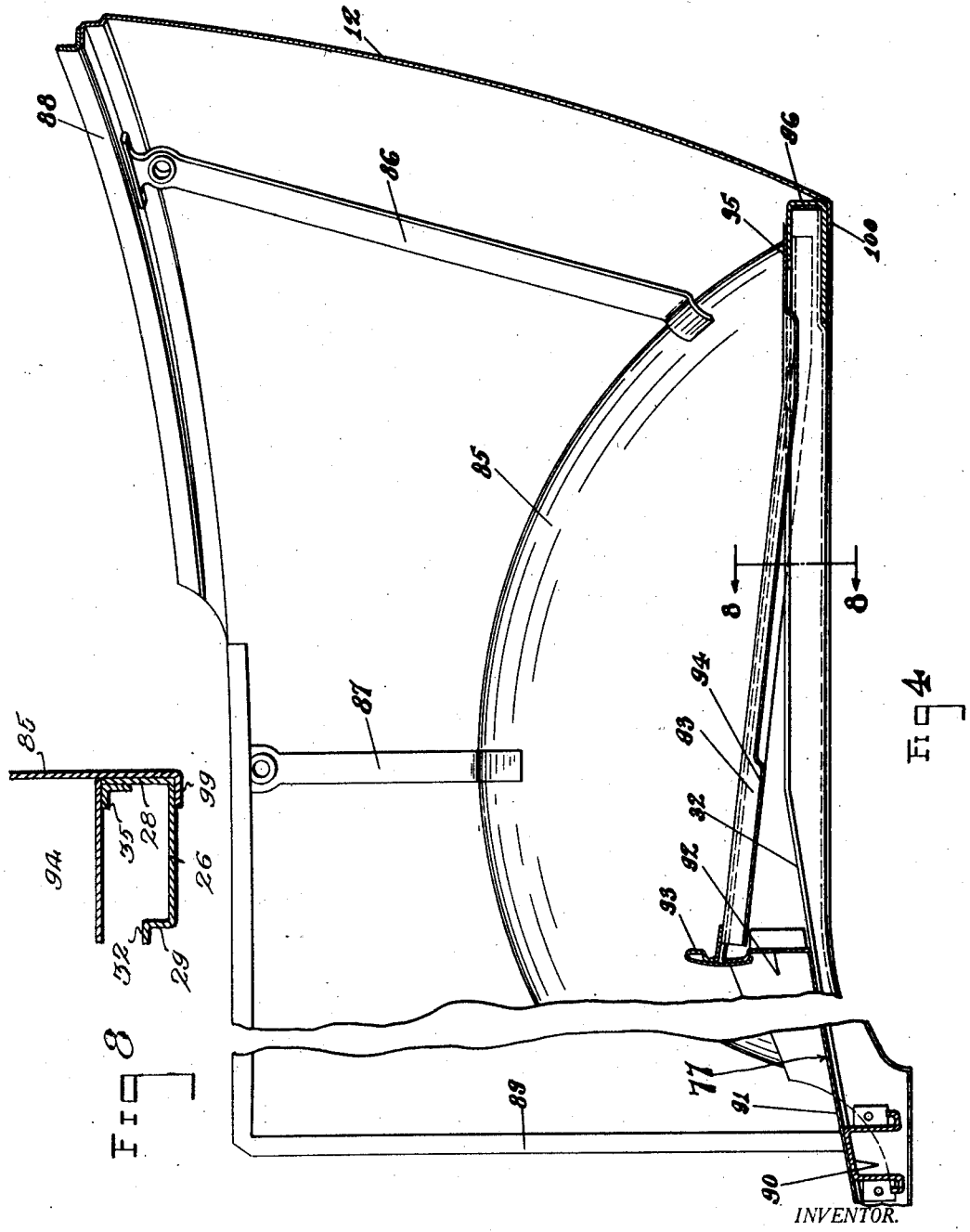

Patented Dec. 11, 1928.

1,694,883

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed December 28, 1923. Serial No. 683,145.

This invention relates to improvements in automobile bodies and has to do, more particularly, with automobile bodies which are constructed entirely of metal.

One of the principal objects of my invention is to provide an automobile body construction which is particularly strong and durable and which is especially applicable to the manufacture of touring car bodies of large capacity, such as are used on the heavier and more expensive automobiles.

A further object of my invention is to provide an improved metal sill construction for automobile bodies, which is particularly adapted to give strength and rigidity to the body and to prevent buckling under heavy loads.

A further object of my invention is to provide an improved threshold construction for reinforcing and strengthening those portions of the body directly beneath the door openings therein.

A further object of my invention is to provide a metal body construction having improved means for supporting the bottom of the rear seat so as to permit the placing of the seat at a lower level in the body than has been customary heretofore, thus lowering the center of gravity of the body and load.

A further object of my invention is to provide an improved floor and heelboard construction for metal automobile bodies, and improved means for supporting and securing the tonneau floor, heelboard and seat pan.

Another object of my invention is to provide a simple, inexpensive but strong construction forming a transverse connection between the sills.

Further objects, and objects relating to details and economies of construction and operation, will definitely appear from the detailed description to follow. I accomplish the objects of my invention, in one instance, by the devices and means set forth in the following specification. My invention is clearly defined and pointed out in the appended claims. A body constituting a preferred embodiment of my invention is illustrated in the accompanying drawings forming a part of this specification, in which:

Fig. 1 is a view, in side elevation, of a body constructed in accordance with my invention.

Fig. 2 is an enlarged, longitudinal, sectional view through the forward portion of such body.

Fig. 3 is an enlarged, longitudinal, sectional view through the central portion of such a body.

Fig. 4 is an enlarged, longitudinal, sectional view through the rear portion of such a body.

Fig. 5 is a detail, sectional view, taken on the line 5—5 of Fig. 2.

Fig. 6 is a detail, sectional view, taken on the line 6—6 of Fig. 2.

Fig. 7 is a detail, sectional view, taken on the line 7—7 of Fig. 3.

Fig. 8 is a detail, sectional view, taken on the line 8—8 of Fig. 4.

Fig. 9 is a plan view of one of the sills used in this body construction, and

Fig. 10 is a view, in side elevation, of the sill shown in Fig. 9.

In the drawings, the same reference numerals refer to the same parts throughout the several views, and the sectional views are taken looking in the direction of the arrows at the ends of the section lines.

My invention relates to automobile bodies constructed entirely of metal and, more particularly, to automobile bodies of the type covered by my prior U. S. Letters Patent, No. 1,143,635, June 22, 1915. Bodies of this type include a skeleton frame, to give external appearance to the body and also cooperating with the skeleton frame to give strength and rigidity to the complete structure. The skeleton frame is usually formed of sheet metal stampings and may include a pair of longitudinally-extending sheet metal body sills and suitable upright members integrally connected to said sills and defining the edges of the door openings in the sides of the body. The shell, which gives external appearance to, and cooperates in lending strength and rigidity to the body, is usually composed of a number of sheet metal panels or stampings which are integrally secured to, and mutually reinforced by, the skeleton frame as well as each other. Such shell stampings may include such parts as the cowl, tonneau, front seat and side panels. My present invention relates, more particularly, to the construction of the body sills and to the means for supporting the rear seat pan from such sills whereby the rear seat is carried at a lower level in the body than has been customary heretofore. In general, I accomplish the objects of my invention by providing an automobile body having a pair of sheet metal sills, each of which is channel-shaped in cross-section, and arranged with the channel presenting upwardly. I propose to provide such a sill extending from one end of the body to the other, that is, from the front of the cowl to the rear of the tonneau. This sill I propose to make channel-shaped, as already stated, and it may also vary in width at different points of its length. I propose to provide a sill having one wall of the channel substantially straight from end to end, while the other wall of this channel may be curved longitudinally to conform to the curvature of the lower edge of the body of which the sill forms a part. I also propose to provide a sheet metal sill of this character having its rear end offset upwardly above the plane of the forward end so as to provide a "kick-up" for the tonneau portion of the sill. I also propose to widen the outer side wall or flange of the channel sill materially at its upwardly offset part, so as to give added strength and rigidity to that portion of the sill. I propose to support the cushion for the rear seat directly from the rear ends of such body sill and, to accomplish that purpose, I may provide suitable members secured to such sills and supporting and connected to the edges of the seat pan. This permits me to support the rear seat comparatively low in the body. I also propose to provide a transverse connection between the sills which is strong but light in weight and economical to manufacture. This transverse connection may consist of a plurality of channel members which are integrally connected together and to the sills. Certain of these channel members may open upwardly and serve as recesses or compartments for the storage of auxiliary folding seats. If desired, the inner vertical flanges of the sills may be offset outwardly at the places at which such transverse connecting channel members are to be connected. I also propose to provide a strong threshold construction, in which there is a threshold member secured to a flange of the side panel and supported by channels carried by the sill.

In the accompanying drawings, I have illustrated an automobile body which constitutes one practical embodiment of my invention. Referring to the numbered parts of the drawings, it will be seen that this body includes a body shell, to give external appearance and cooperating to lend strength and rigidity to the body, made up of the cowl panel, 10, the side panels, 11, the tonneau panel, 12, and the panels, 13 and 14, below the front and rear door openings, respectively. This shell also includes the front seat panel, 15, extending transversely of the body, between the front and rear door openings, as shown in Figs. 1 and 3. The body is also provided with the usual hinged doors, indicated in outline at 16 and 17. The cowl panel, 10, is stamped or pressed into the desired shape and curvature to form that part of the body shell in front of the front door opening. The cowl panel is provided with a bead, 18, near the front edge thereof and a forwardly extending flange, 19, which is turned inwardly, at 20. This forms an offset ledge to receive the rear edge of the engine hood. The forward portion of the cowl panel is stiffened and reinforced by the transversely-extending shroud pan, 21, having its edge portion flanged rearwardly, at 22, and fitting against and integrally secured to the flange, 19, of the cowl panel. An opening is provided in the lower central portion of the shroud pan, surrounded by a marginal flange, 23, the upper portion of which is enlarged and inclined to form the flange or shoulder, 24, which acts as a support or ledge for receiving the upper ends of the toe board supports.

The skeleton frame of this body includes a pair of longitudinally-extending body sills, 26, which are arranged, one on each side of the body, to extend from the rear of the tonneau to the front of the cowl. Each of these sills is a pressed metal member, preferably channel-shaped in cross-section. One of these sills is illustrated in Figs. 9 and 10, and it will be seen that the sill, 26, comprises a horizontal body portion which has an upwardly-extending flange, 27, at its outer edge, and an upwardly-extending flange, 29, at its inner edge. The flange, 29, is substantially straight, from end to end, except at the point, 31, where it is off-set outwardly for purposes to be set forth hereinafter. On the other hand, the flange, 27, is curved longitudinally to conform to the longitudinally curved contour of the lower edge portion of the automobile body. The rear portion of the sill, 26, is off-set upwardly, so that it lies in a plane above the forward portion thereof, as shown in Fig. 10. This off-set or "kick-up" occurs at a point slightly in the rear of the rear edge of the rear door opening. The curved flange, 27, runs from the forward end of the sill to such off-set. This off-set, or "kick-up", occurs at that portion of the body which is known as the wheel housing, and the outer edge of the sill is off-set inwardly at this point. The outer flange, 27, therefore, terminates at the "kick-up", and a vertical flange, 28, is provided on the outer edge of the sill extending from this off-set to the rear end of the body. The flange, 28, is curved longitudinally to conform to the lower edge of the wheel housing and is considerably wider than the flange, 27, as will appear from Fig. 10. The flange, 29, at the inner edge of the sill is offset outwardly somewhat, beginning at a point midway between the front and rear door openings and extending almost to the rear of the rear door openings. This offset portion, 31, of flange, 29, constitutes a continuation of the forward and rear portions of the flange which are in line with each other and longitudinally straight. The forward portion of the flange, 29, is provided with an inwardly-extending flange, 30, at its upper edge, and the rear portion of the flange, 29, is also provided with a similar inwardly-extending flange, 32. These flanges, 30 and 32, serve as supports for the floor boards or panels forming the bottom of the body. A gusset plate, 33, is rigidly secured to the outer edge of the sill and connects the flanges, 27 and 28, at the "kick-up" offset, as shown in Figs. 9 and 10. The rear portion of the vertical flange, 29, varies in depth or width, as shown in Fig. 10, and the flange, 32, is inclined upwardly from a point slightly in advance of the rear door post to the point, 34, in the rear of the front edge of the rear seat, from which point it continues rearwardly in approximately the same horizontal plane. The flange, 28, varies in depth or width also and the upper edge of this flange slopes upwardly to the front edge of the rear seat and, thence, downwardly to the rear of the sill. An angle bar, 35, is integrally secured to the flange, 28, adjacent to the downwardly sloping upper edge thereof. This angle bar constitutes a support for the seat pan, as will be pointed out presently.

In Fig. 5, I have shown the connection between the cowl panel, 10, and the forward portion of the sill. The lower portions of the cowl panel, 10, are flanged inwardly, at 25, and said flanges extend beneath and are integrally secured to the forward portions of the sills, 26. The rear vertical edges of the side portions of the cowl panel, 10, are flanged inwardly and these flanges are integrally secured to the vertical frame members, 38, constituting the door posts at the forward edges of the front door openings. These door posts are secured to the sill members by means of brackets, 39, which are integrally connected to such posts and to the sills. The rear upper portion of the cowl panel, 10, is slightly offset inwardly, at 40, to receive the flange, 43, at the upper edge of the instrument board or support, 41. The upper portion of this panel forming the instrument board, 41, is flanged rearwardly, at 42, and then forwardly, at 43, forming the flange which fits over and is secured to the offset seat, 40, of the cowl panel. The lower portion of the instrument board is flanged forwardly, at 44, in order to strengthen and stiffen the construction. The cowl structure is further reinforced by means of a windshield bracket, 45, secured within said cowl structure, and adapted to receive the lower ends of the windshield stanchions. The windshield brackets, 45, are secured to the door posts, 38, as at 46. The cowl structure is further reinforced by angle members, 47, extending from the front of the cowl to the door posts, 38. The rear ends of said angle members are secured, at 48, to the windshield brackets, 45, while the forward ends of said angle members are flanged downwardly, at 49, and integrally secured to the shroud pan, 21. The angle members, 50, are each provided with a foot, 51, at the lower end thereof, which is secured to the corresponding sill, 26, and their upper ends rest upon the inclined flange, 24, of the shroud pan and are integrally secured thereto. There are two of these angle members, 50, one secured to each side of the cowl and forming the supports for the toe boards.

The construction of those parts of the body beneath the front door openings and constituting the thresholds for such openings is shown particularly in Fig. 6. The panels, 13, are provided with lower inturned flanges, 53, which extend under the sills, 26, and are integrally secured thereto. These panels, 13, are also provided with upper inturned flanges, 52, at the lower edges of the door openings. A threshold member, 54, lies over and is integrally secured to said flange, 52, and extends inwardly therefrom being spaced from the horizontal base of the sill, 26. A plurality of channel members, 55, are interposed between the sill, 26, and such threshold member, 54, near the inner edge of the latter, in order to support the same and to provide a threshold construction which is essentially a box girder in form. The inner edge of the threshold member, 54, if desired, is provided with a down-turned flange, 56, which serves as an abutment for the ends of floor boards supported on the flanges, 30, of the sill.

The construction of the intermediate portion of the body is best illustrated in Fig. 3. The side panels, 11, are flanged, at their vertical edges, around and are integrally secured to the vertical members, 57 and 58, which constitute the door posts at the rear of the front door openings and the front of the rear door openings, respectively. These door posts, 57 and 58, are integrally connected with the respective body sills, 26. The front seat panel, 15, which extends transversely of the body between the sides thereof, is also integrally connected to the door posts, 58. The lower edge of the panel, 15, is provided with a forwardly-extending flange, 59, which extends under and is integrally secured to the upper flange, 60, of a cross member, 61. The upper flange, 60, is inclined rearwardly to correspond to the inclination of the seat supports on which the front seat cushion is mounted. The cross member, 61, has a forwardly-extending flange, 62, at its lower edge, and the ends of this cross member are mounted upon and integrally secured to the flanges, 30, of the body sills. The bottom of the compartment beneath the front seat is formed by the dish-shaped stamping, 63, having an edge flange, 64, integrally secured to the flange, 62, of the cross member, 61, and a corresponding flange, 64', at its forward edge, which is integrally secured to a channel-shaped cross member, 65. The latter extends across the body and its ends rest upon and are integrally secured to the flanges, 30, of the body sills. It will be observed that the sides of the body, and the two sills, 26, are connected together by the cross members, 61 and 65, as well as by the seat panel, 15, the panel, 63, and the heelboard panel. The heelboard panel for the front seat is substantially U-shaped and comprises a transverse vertical portion, 66, and rearwardly extending side portions, 67. The rear ends of the side portions, 67, of the heelboard panel are integrally secured to the lower portions of the door posts, 57. The transverse vertical portion, 66, of the heelboard panel is provided with a rearwardly extending flange, 68, at its lower edge, which rests upon and is integrally secured to the channel-shaped cross member, 65. A cushion retainer, 69, is secured to the upper edge of the heelboard, and supports, 70 and 71, for the front seat cushion, are also secured to said heelboard and to the cross member, 61, respectively. The lower portions of the side panels, 11, are flanged inwardly, at 72, said flanges extending under the sill, 26, and being integrally secured thereto.

In the particular body illustrated in these drawings, the bottom of the body in the rear of the front seat is provided with a pair of recesses or compartments to receive auxiliary folding seats. These compartments are formed by channel members, 73, having upwardly-extending flanges, 74, at their side edges. The flanges, 74, adjacent the outer sides of the body, lie against and are integrally secured to the upstanding flanges, 31, at the inner edges of the sill members, 26. The inner flanges, 74, are integrally secured to the down-turned flanges, 75, of the floor member, 76, which is channel-shaped and is interposed between the two channels, 73, at opposite sides of the body, and which are to receive the folding seats. In the rear of said compartment, there is a stamping, 77, extending from one sill to the other and forming a part of the body floor. This stamping is provided with a down-turned flange, 78, at its forward edge which is integrally secured to corresponding flanges, 79, at the rear edges of the stampings, 76 and 73. The stamping, 76, is provided with an upturned flange, 80, at its forward edge, which is integrally secured to the cross member, 61. The panels, 14, forming the part of the body shell beneath the rear door openings, are provided with inturned flanges, 81, at their lower edges, which extend beneath and are integrally secured to the sill members, 26, as shown in Fig. 7. The panels, 14, are also provided with upper flanges, 82, extending inwardly of the body to which the threshold members, 83, are secured. These threshold members, 83, are shown provided with down-turned flanges, 84, at their inner edges, which serve as abutments for the edges of the floor boards or strips of carpet which are usually placed on the bottom of the body.

The tonneau panel, 12, is provided with inwardly-pressed portions, in the sides thereof, forming the wheel housings, 85. The tonneau is also provided with the bracing members, 86 and 87, secured to the wheel housings, 85, and to the garnish rail, 88, at the top of the tonneau panel, respectively. These members not only serve to reinforce the tonneau structure, but they are also fitted to receive the top irons on which the automobile top is carried. Angle members, 89, are provided at the forward edges of the tonneau panel, constituting the rear door posts. The forward vertical edges of the tonneau panel, 12, are flanged around and integrally secured to these door posts, and such door posts are integrally connected to the sill members, 26. The sills, 26, at opposite sides of the body, are also connected together by the channel-shaped cross member, 90, located in line with the door posts, 89. The upper surface of this channel member, 90, is inclined as shown in Fig. 4, so as to receive the inclined portion, 91, forming a part of the floor stamping, 77. This stamping, 77, is also provided with an upturned flange, 92, at its rear edge, constituting the heelboard of the rear seat. The ends of this flange, 92, are secured to the flanges, 28, of the sills, 26. A cushion retaining member, 93, is secured to the upper edge of the heelboard flange, 92. The rear end extremities of the sills are bent inwardly, as at 97, and offset slightly, as at 98, to receive the ends of the channel-shaped cross member, 96, which is integrally secured to the rear ends of the sills and ties them together. A seat pan, 94, is provided, which, at the sides thereof, rests upon and is secured to the angle members, 35, carried by the flanges, 28, of the respective sills. This seat pan, 94, is inclined rearwardly and at its rear portion is slightly bent upwardly, as at 95, so as to provide a flange to seat upon the upper flange of the cross member, 96, and is secured thereto. This seat pan, 94, is adapted to receive the rear seat cushion. The lower edge portions of the wheel housings, 85, of the tonneau panel, are flanged inwardly, at 99, and such flanges extend beneath and are secured to the sills, 26. The rear lower edge portion of the tonneau panel, 12, is flanged inwardly, at 100, beneath and is integrally secured to the cross member, 96.

It will be observed that the body, which has just been described, and which is illustrated in the accompanying drawing, has a skeleton frame consisting of the two sill members, 26, extending from the forward end of the cowl to the rear end of the tonneau, on opposite sides of the body, the door posts, such as the posts, 38, 57, 58 and 89, which are integrally connected with the sill members, and the various cross members connecting the sills, such as the cross members, 65, 61, 90 and 96. The skeleton frame which includes these various members takes the stresses and strains coming upon the body in use, and mutually reinforces and braces, and is reinforced and braced by, the panels forming the shell of the body. This body also includes the panels 10, 11, 12, 13, 14 and 15, which give external appearance to the body and which cooperate with the frame members to produce a rigid structure. In this body construction, the panels forming the shell coact with the frame members to resist the stresses and strains coming upon the body in use. The sill construction illustrated in this application is of the "straight sill" type, and each of the sill members has an outer edge portion which conforms to the curvature of the lower portion of the body, while the inner edge portion of the sill member is formed by a girder section which is substantially straight from end to end. In this respect, the construction described and claimed herein is an embodiment of the invention described in my pending applications, Serial Number 290,787, filed April 17th, 1919, and Serial Number 431,732, filed December 18, 1920. The invention described in this application is also an improvement upon the invention described and claimed in U. S. Letters Patent No. 1,431,314, issued October 10th, 1922, on my application. The said Letters Patent show a sill member which is substantially channel-shaped in cross section, and which is of the "straight sill" type but, in said patent, the sill does not extend to the rear end of the tonneau but terminates at the forward edge thereof. In the present invention, however, I have provided a channel-shaped sill of the "straight sill" type which extends from the forward end of the cowl to the rear end of the tonneau, thus providing a very solid and rigid sill member which runs from one end of the body to the other. This construction adds great strength and rigidity to the body and it is particularly useful in constructing a body of the larger type adapted to carry seven or more passengers. Such bodies are necessarily long and require more reinforcement and stronger sill members than the smaller bodies.

It will be observed that the sill member is comparatively wide, and I have provided a novel threshold construction for use at the door openings, and particularly at the front door openings, where the sill is wider than at other points. In this threshold construction there is a threshold member, which is fastened to the side panel, and is supported, in part, by the side panel, and, also, by the channel members, 55, resting on and secured to the base of the sill member, 26. This forms a threshold construction which is substantially in the form of a box girder and is very strong and rigid.

It will be observed that I have provided a particularly simple and inexpensive construction for the tonneau floor of the body, which provides recesses or compartments to receive folding seats, and that these compartments are formed by the channels, 73, having the upturned flanges, 74, secured to the flanges, 31, of the sill members, 26. These compartment members are therefore secured directly to the sills and the flanges, 29, are offset inwardly to form the flanges, 31, at the points at which such compartment members are to be fastened in place. These panels, 73 and 76, not only provide compartment for receiving the auxiliary folding seats, but they also constitute channel-shaped reinforcing members which tie the body sills together between the front and the rear seats. This adds very greatly to the strength and rigidity of the body.

I have provided a very simple means for supporting the seat pan on which the cushion for the rear seat is carried. It will be observed that the edges of this rear seat pan, 94, rest upon and are secured to the angle members, 35, which in turn are integrally secured to the vertical flanges, 28, at the outer edges of the sill members, 24. This makes a very simple construction and permits the securing of the seat pan in a comparatively low position in the body. It will be observed that the sill members, 26, are channel-shaped throughout their length, and that the rear portions of said sill members are offset so that they lie in a plane above the forward portions thereof. The outer edge of the rear portion of the sill is also offset inwardly from the outer edge of the forward portion thereof so as to provide the necessary clearance at the wheel housing. The gusset plate, 33, connecting the flanges, 27 and 28, at this offset, adds greatly to the rigidity of the sill members at this point.

The various parts comprising the body are integrally secured together by spot or electric welding.

I am aware that the particular body construction illustrated in the accompanying drawing is susceptible of many changes and variations without departing from the spirit of my invention, and I desire, therefore, to claim my invention broadly, as indicated by the appended claims.

Having thus described my invention what I claim as new and useful and desire to secure by Letters Patent is:

1. In an automobile body, the combination of a pair of metal sills disposed at opposite sides of the body and extending longitudinally thereof, each of said sills including a horizontal body portion and a vertical flange at the inner edge thereof, comprising front and rear portions, which are longitudinally straight and in line with each other, and an intermediate portion offset outwardly of the sill, and a plurality of sheet metal panels rigidly secured to said sills and forming the body shell.

2. In an automobile body, the combination of a pair of metal sills disposed at opposite sides of the body and extending longitudinally, each of said sills including a horizontal body portion and a vertical flange at the inner edge of said body portion, said vertical flange comprising front and rear portions which are longitudinally straight and in line with each other, and an intermediate portion offset outwardly of the sill, the front and rear portions of said flange having a lateral flange at their upper edges, and a plurality of sheet metal panels rigidly secured to said sills and forming the body shell.

3. In an automobile body, the combination of a pair of metal sills disposed at opposite sides of the body and extending longitudinally thereof from the front of the cowl to the rear of the tonneau, each of said sills being of channel shape in cross-section, and disposed with the channel presenting upwardly and having its rear portion offset upwardly so as to lie in a plane above the forward portion thereof, the flange constituting the outer wall of the channel being offset inwardly at the point at which said channel is offset upwardly, and a plurality of sheet metal panels secured to said sills and forming the body shell.

4. In an automobile body, the combination of a pair of metal sills disposed at opposite sides of the body and extending longitudinally thereof from the front of the cowl to the rear of the tonneau, each of said sills comprising a horizontal body portion, a vertical flange at the inner edge of said body portion, and a pair of vertical flanges at the outer edge of said body portion, said last mentioned flanges being offset with respect to each other, a gusset plate connecting said offset flanges, and a plurality of sheet metal panels secured to said sills and forming the body shell.

5. In an automobile body, the combination of a pair of metal sills, each of channel shape in cross-section and having a flange forming the outer wall of said channel and shaped to conform to the curvature of the lower portion of the tonneau, and a stiffening flange forming the inner wall of said channel, the outer wall of said channel being deeper than the inner wall and having its upper edge rearwardly and downwardly inclined, a seat pan supported by said inclined edges of the outer flanges of said sills.

6. In an automobile body, the combination of a pair of metal sills disposed at opposite sides of the body and extending longitudinally thereof, each of said sills having a vertically extending flange at the outer edge thereof, the upper edge of which slopes downwardly from the front of the rear seat to the rear end of the sill, an angle bar secured to each of said flanges adjacent said upper edge, a seat pan supported on said angle bars, and a plurality of sheet metal panels rigidly secured to said sills and forming the body shell.

7. In an automobile body, the combination of a pair of metal sills extending longitudinally of the body, each of said sills comprising a horizontal body portion having vertical flanges at the inner and outer edges thereof, the inner flanges of said sills sloping upwardly from points in front of the rear door posts to points in rear of the front edge of the rear seat, and the outer flanges of said sills sloping downwardly from the front edge of the rear seat to the rear ends of the sills, a sheet metal panel supported on the sloping inner flanges of said sill, and having a vertical portion forming a heelboard at the front of the rear seat, a seat pan for the rear seat supported on the downwardly sloping outer flanges of said sill, a cross member connecting said sills and a plurality of sheet metal panels secured to said sills and forming the body shell.

8. In an automobile body, the combination of a pair of metal sills arranged at opposite sides of the body and extending longitudinally thereof, a cross-member connecting said sills and disposed in line with the rear edges of the rear door openings, the upper surface of said cross member being inclined, an inclined sheet metal panel supported by said sills and resting on the inclined upper surface of said cross member, and a plurality of sheet metal panels secured to said sills and forming the body shell.

9. In an automobile body, the combination of a pair of metal sills disposed at opposite sides of the body and extending longitudinally thereof, each of said sills having a horizontal body portion and a vertical flange at its inner edge, a plurality of channel-shaped members rigidly connected together and to the inner flanges of said sills and constituting a transverse connection between said sills, and a plurality of sheet metal panels secured to said sills and forming the body shell.

10. In an automobile body, the combination of a pair of metal sills disposed at opposite sides of the body and extending longitudinally thereof, each of said sills comprising a horizontal body portion having a vertical flange at its inner edge, a pair of upwardly-opening channels rigidly connected to said inner flanges of the sills, a downwardly-opening channel interposed between said first-mentioned channels and connected to the side walls thereof, and a plurality of sheet metal panels secured to said sills and forming the body shell.

11. In an automobile body, the combination of a pair of metal sills disposed at opposite sides of the body and extending longitudinally thereof, each of said sills comprising a horizontal body portion having a vertical flange at its inner edge, said flange including front and rear portions and an intermediate portion offset outwardly with respect to such front and rear portions, a pair of upwardly-opening sheet metal channel members rigidly connected to the offset portions of said flanges, a downwardly-opening channel member interposed between said first-mentioned channel members and connected thereto, and a plurality of sheet metal panels secured to said sills and forming a body shell.

12. In an automobile body, the combination of a pair of metal sills extending longitudinally of the body, each of said sills comprising a main body portion having an outer flange of substantially uniform height, and a rear portion offset upwardly and inwardly with respect to said main body portion, said rear portion having an outer flange of varying height to support the side edge of a seat pan.

13. In an automobile body, the combination of a pair of metal sills extending longitudinally of the body, each of said sills comprising a horizontal body portion, a vertical extending flange at the inner edge of said body portion, and a plurality of vertically extending flanges at the outer edge of said body portion, said latter flanges being offset with respect to each other.

14. In an automobile body, the combination of a pair of metal sills extending longitudinally of the body, each of said sills comprising a body portion, a vertically extending flange at the inner edge of said body portion, said flange having portions thereof spaced from one another but disposed substantially within the same vertical plane, and vertically extending flanges at the outer edge of said body portion, one of said latter flanges being of substantially greater height than the other and offset inwardly with respect thereto.

15. In an automobile body, the combination of a pair of metal sills extending longitudinally of the body, each of said sills comprising a horizontal body portion, vertically extending flanges at the outer edges thereof, the upper edges of said flanges being sloped downwardly toward the rear ends of the sills, and a sheet metal seat pan supported on said downwardly sloped outer flanges.

16. In an automobile body, a pair of metal sills extending longitudinally of the body, forwardly and rearwardly disposed cross members connecting said sills to form a supporting frame structure for the tonneau floor, and a plurality of inter-connected stampings secured to said cross members, certain of said stampings presenting compartments adapted to receive folding seats therein.

17. In an automobile body, a pair of metal sills extending longitudinally of the body, forwardly and rearwardly disposed cross members inter-connecting said sills to form a supporting frame structure for the tonneau floor, said rearwardly disposed cross member having its upper surface inclined, and a plurality of integrally connected sheet metal stampings, one of said stampings resting on said inclined surface and having its sides integrally joined to the sills, the others having their forward edges secured to said forwardly disposed cross member.

18. A pressed metal body sill extending from the front of the body to the rear thereof and having a substantially continuous vertically extending flange along its outer edge, said flange being of substantially greater height in its rear portion than in its forward portion, said rear portion having its upper edge rearwardly and downwardly inclined to form an inclined support for a seat pan.

19. A pressed metal side sill for vehicle bodies comprising a single unitary stamping extending from the front of the cowl rearwardly to the rear end of the body, said unitary sill stamping having an inner edge, the major portion of which lies in a straight line and an outer edge curved to conform to the contour of the body and including an inward and upward offset in the wheel housing portion thereof.

20. A pressed metal side sill stamping for vehicle bodies extending from the front of the cowl to the rear of the body and having its outer edge offset, in the vicinity of the front of the wheel housing, inwardly and upwardly.

In testimony whereof, I affix my signature.

JOSEPH LEDWINKA.